(12) United States Patent
Furtaw et al.

(10) Patent No.: US 11,255,816 B2
(45) Date of Patent: Feb. 22, 2022

(54) CAPILLARY ELECTROPHORESIS INKJET DISPENSING

(71) Applicant: LI-COR, Inc., Lincoln, NE (US)

(72) Inventors: Michael D. Furtaw, Lincoln, NE (US); Donald T. Lamb, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 0 days.

(21) Appl. No.: 16/860,514

(22) Filed: Apr. 28, 2020

(65) Prior Publication Data

US 2020/0264132 A1 Aug. 20, 2020

Related U.S. Application Data

(62) Division of application No. 15/420,496, filed on Jan. 31, 2017, now Pat. No. 10,670,560.

(60) Provisional application No. 62/289,691, filed on Feb. 1, 2016.

(51) Int. Cl.
*G01N 27/447* (2006.01)

(52) U.S. Cl.
CPC . *G01N 27/44739* (2013.01); *G01N 27/44791* (2013.01)

(58) Field of Classification Search
CPC ....... G01N 27/44791; G01N 27/44739; G01N 27/4473; G01N 27/44721; G01N 27/44782; B01L 3/0268; B01L 3/0241; B01L 3/502753; B01L 3/502761; B01L 3/502738; B01L 3/50273; B01L 2400/0478; B01L 2400/0421; B01L 2400/0415; B01L 2400/0481; B01L 2400/0605; B01L 2400/0638; H01J 49/004; H01J 49/0404; H01J 49/0445; H01J 49/167; F04B 43/00; F04B 43/02; F04B 43/043; F04B 43/009;
(Continued)

(56) References Cited

U.S. PATENT DOCUMENTS

| 4,631,120 A | 12/1986 | Pohl et al. |
| 4,885,076 A | 12/1989 | Smith et al. |
| 5,094,594 A | 3/1992 | Brennan |

(Continued)

FOREIGN PATENT DOCUMENTS

| CN | 101581728 A | 11/2009 |
| CN | 101609088 A | 12/2009 |

(Continued)

OTHER PUBLICATIONS

Application No. CN201780008450.7, Office Action, dated Jul. 14, 2020, 6 pages.

(Continued)

*Primary Examiner* — Gurpreet Kaur
(74) *Attorney, Agent, or Firm* — Kilpatrick Townsend & Stockton LLP

(57) ABSTRACT

Devices, systems, and methods of using them are disclosed that position an end of a capillary electrophoresis tube within an internal tapered nozzle region of an inkjet print head or other microfluidic pump. The capillary electrophoresis tube can extend through an inlet of the microfluidic pump and leave space for a sheath liquid to enter the pump and mix with separated analytes eluted from the capillary electrophoresis tube. The small volume of mixed sheath liquid and analyte can then be jetted through the nozzle at a moving surface, either continuously or as discrete droplets. Relative positions on the surface can indicate separation distances of dispensed analytes.

20 Claims, 12 Drawing Sheets

(58) Field of Classification Search
CPC ...... F04B 43/023; F04B 43/026; F04B 43/04; F04B 43/0045; F04B 43/0054
See application file for complete search history.

(56) References Cited

U.S. PATENT DOCUMENTS

| | | |
|---|---|---|
| 5,234,559 A | 8/1993 | Collier et al. |
| 5,275,710 A | 1/1994 | Gombocz et al. |
| 5,393,975 A | 2/1995 | Hail et al. |
| 5,423,964 A | 6/1995 | Smith et al. |
| 5,474,663 A | 12/1995 | Brunk et al. |
| 5,868,322 A | 2/1999 | Loucks, Jr. et al. |
| 5,916,429 A | 6/1999 | Brunk et al. |
| 5,917,184 A | 6/1999 | Carson et al. |
| 6,179,584 B1 | 1/2001 | Howitz et al. |
| 6,602,391 B2 | 8/2003 | Serikov et al. |
| 6,633,031 B1 | 10/2003 | Schultz et al. |
| 6,787,313 B2 | 9/2004 | Morozova et al. |
| 6,830,934 B1 | 12/2004 | Harding et al. |
| 7,759,639 B2 | 7/2010 | Schlaf et al. |
| 7,784,911 B2 | 8/2010 | Kim et al. |
| 8,293,337 B2 | 10/2012 | Bhatnagar et al. |
| 8,294,119 B2 | 10/2012 | Arscott et al. |
| 8,470,570 B2 | 6/2013 | Kim et al. |
| 8,613,845 B2 | 12/2013 | Maxwell et al. |
| 9,182,371 B2 | 11/2015 | Kennedy et al. |
| 9,465,014 B2 | 10/2016 | Dovichi et al. |
| 10,126,264 B2 | 11/2018 | Furtaw |
| 10,737,268 B2 | 8/2020 | Furtaw et al. |
| 2001/0055529 A1 | 12/2001 | Wixforth |
| 2002/0197622 A1 | 12/2002 | McDevitt et al. |
| 2003/0178563 A1 | 9/2003 | Makarov et al. |
| 2003/0215855 A1 | 11/2003 | Dubrow et al. |
| 2004/0058423 A1 | 3/2004 | Albritton et al. |
| 2004/0113068 A1 | 6/2004 | Bousse et al. |
| 2004/0247450 A1 | 12/2004 | Kutchinsky et al. |
| 2004/0265182 A1 | 12/2004 | Chen et al. |
| 2005/0023141 A1 | 2/2005 | Amshey et al. |
| 2005/0040328 A1 | 2/2005 | Donegan et al. |
| 2006/0192107 A1 | 8/2006 | Devoe et al. |
| 2007/0035587 A1 | 2/2007 | Lee et al. |
| 2007/0039866 A1 | 2/2007 | Schroeder et al. |
| 2009/0035770 A1 | 2/2009 | Mathies et al. |
| 2009/0060797 A1 | 3/2009 | Mathies et al. |
| 2011/0005932 A1 | 1/2011 | Jovanovich et al. |
| 2012/0043208 A1 | 2/2012 | Jin et al. |
| 2013/0032031 A1 | 2/2013 | Bartko et al. |
| 2013/0140180 A1 | 6/2013 | Dovichi et al. |
| 2013/0213811 A1 | 8/2013 | Kennedy et al. |
| 2013/0327936 A1 | 12/2013 | Ramsey et al. |
| 2013/0337502 A1 | 12/2013 | Bosmeyer et al. |
| 2014/0014747 A1 | 1/2014 | Moeller et al. |
| 2014/0319335 A1 | 10/2014 | Morris et al. |
| 2015/0023877 A1 | 1/2015 | Bu et al. |
| 2015/0247187 A1 | 9/2015 | Bermpohl |
| 2015/0279648 A1 | 10/2015 | Furtaw et al. |
| 2016/0011149 A1 | 1/2016 | Furtaw |
| 2016/0153944 A1 | 6/2016 | Douce et al. |
| 2016/0181078 A1 | 6/2016 | Kovarik |
| 2017/0176386 A1 | 6/2017 | Gentalen |
| 2017/0219522 A1 | 8/2017 | Furtaw et al. |
| 2018/0036729 A1 | 2/2018 | Furtaw et al. |
| 2018/0036730 A1 | 2/2018 | Furtaw et al. |

FOREIGN PATENT DOCUMENTS

| | | |
|---|---|---|
| CN | 101613660 A | 12/2009 |
| JP | 3775305 | 5/2006 |
| WO | 2014014529 A3 | 3/2014 |
| WO | 2015019159 A1 | 2/2015 |
| WO | 2015031820 A1 | 3/2015 |
| WO | 2016010748 | 1/2016 |
| WO | 2017136284 | 8/2017 |
| WO | 2018031479 | 2/2018 |
| WO | 2018031483 | 2/2018 |

OTHER PUBLICATIONS

Amantonico et al., "Facile analysis of metabolites by capillary electrophoresis coupled to matrix-assisted laser desorption/ionization mass spectrometry using target plates with polysilazane nanocoating and grooves," Analyst, vol. 134, 2009, pp. 1536-1540.
Anderson et al., "Western Blotting using Capillary Electrophoresis," Analytical Chemistry, 2011, 1350-1355.
Avseenko et al., "Immobilization of Proteins in Immunochemical Microarrays Fabricated by Electrospray Deposition," Anal. Chem. vol. 73, 2001, pp. 6047-6052.
Avseenko et al., "Immunoassay with Multicomponent Protein Microarrays Fabricated by Electrospray Deposition," Anal. Chem.,vol. 74, 2002, pp. 927-933.
Back et al., "Capillary Electrophoresis with Nanoparticle Matrix for DNA Analysis," Bulletin of the Korean Chemical Society , vol. 27, No. 1, 2006, pp. 133-136.
CN201780008450.7, "Office Action," dated Dec. 17, 2019, 8 pages.
Delaney et al., "Inkjet printing of proteins," Soft Matter, vol. 5, 2009, pp. 4866-4877.
Derby, "Inkjet Printing of Functional and Structural Materials: Fluid Property Requirements, Feature Stability, and Resolution," Annu. Rev. Mater. Res. 40, 2010, pp. 395-414.
EP17747982.1, "Extended European Search Report," dated Aug. 7, 2019, 10 pages.
Ertl et al., "Capillary Electrophoresis Chips with a Sheath-Flow Supported Electrochemical Detection System," Analytical Chemistry, vol. 76, No. 13, XP-001209796, Jul. 1, 2004, pp. 3749-3755.
Gast et al., "The development of integrated microfluidic systems at GeSiM," Lab on a Chip, 3, 2003, 6N-10N.
Han et al., "BioPen: direct writing of functional material at the point of care," Scientific Reports vol. 4, Article No. 4872, 2014, pp. 1-5.
Helmja et al., "Fraction collection in capillary electrophoresis for various stand-alone mass spectrometers," Journal of Chromatography A, vol. 1216, 2009, pp. 3666-3673.
Hou et al., "Direct Detection and Drug-Resistance Profiling of Bacteremias using Inertial Microfluidics," Lab on a Chip, vol. 15, No. 10, 2015, pp. 2297-2307.
Jaworek et al., "Electrospraying route to nanotechnology: An overview," Journal of Electrostatics, vol. 66, 2008, pp. 197-219.
Jin et al., "Western Blotting Using Microchip Electrophoresis Interfaced to a Protein Capture Membrane," Analytical Chemistry 85(12), 2013, 6073-6079.
Johnson et al., "A CE-MALDI Interface Based on the Use of Prestructured Sample Supports," Anal. Chem.,vol. 73, 2001, pp. 1670-1675.
Kim et al., "Design and evaluation of single nozzle with a non-conductive tip for reducing applied voltage and pattern width in electrohydrodynamic jet printing (EHDP)," J. Micromech. Microeng, vol. 20, 2010, pp. 7.
Korkut et al., "Enhanced Stability of Electrohydrodynamic Jets through Gas Ionization," PRL,vol. 100, 2008, pp. 034503-1-034503-4.
Lu et al., "Coupling Sodium Dodecyl Sulfate-Capillary Polyacrylamide Gel Eletrophoresis with Matrix-Assisted Laser Desorption Ionization Time-of-Flight Mass Spectrometry via a Poly(tetrafluoroethylene) Membrane," Anal. Chem., vol. 83, 2011, pp. 1784-1790.
Magnusdottir et al., "Micropreparative capillary electrophoresis of DNA by direct transfer onto a membrane," Electrophoresis, vol. 18, 1997, pp. 1990-1993.
Martin et al., "Inkjet printing—the physics of manipulating liquid jets and drops," Engineering and Physics-Synergy for Success, IOP Publishing, Journal of Physics: Conference Series 105, 2008, pp. 1-14.
Morozov et al., "Electrospray Deposition as a Method for Mass Fabrication of Mono- and Multicomponent Microarrays of Biological and Biologically Active Substances," Anal. Chem., vol. 71, 1999, pp. 3110-3117.
Morozov et al., "Electrospray Deposition as a Method to Fabricate Functionally Active Protein Films," Anal. Chem, 1999, pp. 1415-1420.

(56) References Cited

OTHER PUBLICATIONS

PCT/US2015/039121, "International Search Report and written opinion," dated Sep. 30, 2015, 9 pages.

PCT/US2017/015657, "International Preliminary Report on Patentability," dated Feb. 3, 2018, 13 pages.

PCT/US2017/015657, "International Search Report and Written Opinion," dated Apr. 4, 2017, 18 pages.

PCT/US2017/015657, "Written Opinion," dated Aug. 31, 2017, 14 pages.

PCT/US2017/045774, "International Preliminary Report on Patentability," dated Feb. 21, 2019, 9 pages.

PCT/US2017/045778, "International Preliminary Report on Patentability," dated Feb. 21, 2019, 9 pages.

Rejtar et al., "Off-Line Coupling of High-Resolution Capillary Electrophoresis to MALDI-TOF and TOF/TOF MS," Journal of Proteome Research, vol. 1(2), 2002, pp. 171-179.

Shi Jin et al., "Multiplexed Western Blotting Using Microchip Electrophoresis," Analytical Chemistry, vol. 88, No. 13, Jun. 2016, pp. 6703-6710.

Smith et al., "Sample Introduction and Separation in Capillary Electrophoresis, and Combination with Mass Spectrometric Detection," Talanta, vol. 36, No. 1/2, Jan.-Feb. 1989, pp. 161-169.

Tracht et al., "Postcolumn Radionuclide Detection of Low-Energy β Emitters in Capillary Electrophoresis," Anal. Chem, 1994, pp. 2382-2389.

Uematsu et al., "Surface morphology and biological activity of protein thin films produced by electrospray deposition," Journal of Colloid and Interface Science, vol. 269, 2004, pp. 336-340.

Wei et al., "Electrospray sample deposition for matrix-assisted laser desorption/ionization (MALDI) and atmospheric pressure MALDI mass spectrometry with attomole detection limits," Rapid Commun. Mass Spectrom, 2004, pp. 1193-1200.

Zhang et al., "Capillary Electrophoresis Combined with Matrix-Assisted Laser Desorption/ionization Mass Spectrometry; Continuous Sample Deposition on a Matrix-precoated Membrane Target," Journal of Mass Spectrometry, Journal of Mass Spectrometry, vol. 31, 1996, pp. 1039-1046.

Zhong et al., "Recent advances in coupling capillary electrophoresis-based separation techniques to ESI and MALDI-MS," Electrophoresis, vol. 35, 2014, pp. 1214-1225.

PCT/US2015/039121, "International Preliminary Report on Patentability," dated Jan. 26, 2017, 7 pages.

PCT/US2017/045774, "International Search Report and Written Opinion," dated Dec. 1, 2017, 16 pages.

PCT/US2017/045778, "International Search Report and Written Opinion," dated Dec. 22, 2017, 13 pages.

Application No. CN201780047883.3, Office Action, dated Jan. 6, 2021, 12 pages.

Application No. CN201780047902.2, Office Action, dated Jan. 6, 2021, 9 pages.

U.S. Appl. No. 15/670,896, Non-Final Office Action, dated Feb. 23, 2021, 16 pages.

U.S. Appl. No. 16/876,895, Non-Final Office Action, dated Mar. 25, 2021, 9 pages.

CN201780047902.2, Office Action, dated Sep. 28, 2021, 8 pages.

CAPILLARY ELECTROPHORESIS INKJET DISPENSING

CROSS-REFERENCES TO RELATED APPLICATIONS

This application is a divisional of U.S. patent application Ser. No. 15/420,496, filed Jan. 31, 2017, which claims the benefit of U.S. Provisional Application No. 62/289,691, filed Feb. 1, 2016, the contents of which are incorporated herein in their entireties for all purposes.

STATEMENT AS TO RIGHTS TO INVENTIONS MADE UNDER FEDERALLY SPONSORED RESEARCH AND DEVELOPMENT

This invention was made with government support under 1R43GM112289-01 awarded by the National Institutes of Health and National Institute of General Medical Studies. The government has certain rights in the invention.

BACKGROUND

Western blotting is a ubiquitous analytical technique for identifying and quantifying specific proteins in a complex mixture. In the technique, gel electrophoresis is used to separate proteins in a gel based on properties such as tertiary structure, molecular weight, isoelectric point, polypeptide length, or electrical charge. Once separated, the proteins are then transferred from the gel to a membrane—typically made of nitrocellulose, nylon, or polyvinylidene fluoride (PVDF)—that binds proteins non-specifically. A commonly used method for carrying out this transfer is electroblotting, in which an electrical current is used to pull proteins from the gel into the membrane. The membrane is then stained with probes specific for the proteins being targeted, allowing the location and amounts of these proteins to be detected.

Capillary electrophoresis provides an alternative to the gel electrophoresis separation associated with Western blotting and other biotechnology procedures. In capillary electrophoresis, materials such as proteins are separated electrokinetically, as in gel electrophoresis, but with much smaller required volumes. The capillaries used in this technique are typified by diameters smaller than one millimeter and are in some instances incorporated into microfluidic or nanofluidic devices.

There exists in the art a need to improve and advance the technique of Western blotting, as well as other membrane analysis methods such as Northern blotting and Southern blotting. The numerous steps involved with these methods makes them relatively time-consuming, labor-intensive, and prone to errors or variability.

BRIEF SUMMARY

In general, provided herein are devices and methods for the dispensing of small, controllable amounts of material that have been separated by capillary electrophoresis. A capillary electrophoresis tube is positioned such that a portion of the tube proximate to the tube outlet is within a microfluidic pump chamber. The outlet of the capillary electrophoresis tube is positioned within a microfluidic nozzle that is in fluidic connection to the microfluidic pump chamber. The microfluidic pump and microfluidic nozzle hold a sheath fluid that enters the pump through a sheath flow tube that is connected to the pump inlet. An impulsive pump element is mechanically connected to the microfluidic pump and electrically connected to an impulsive pump actuator, such that expansion and/or contraction of the pump element in response to electrical signals from the pump actuator causes deformation of at least a portion of the pump chamber. This deformation causes some of the sheath fluid to be expelled out of the microfluidic chamber through a nozzle outlet of the microfluidic nozzle.

As separated material exits the capillary electrophoresis tube, it mixes with the sheath fluid located proximate to the capillary outlet. As the sheath fluid is expelled through the microfluidic nozzle outlet, it entrains the separated material, resulting in a mixture dispensed in the form of discrete droplets, a semi-continuous stream, or a continuous stream. The resolution of dispensed separated material can be maintained by decreasing the mixing volume that the separated material is exposed to in the microfluidic nozzle after eluting from the capillary electrophoresis tube. One approach for decreasing this volume is to taper one or both of the microfluidic nozzle and capillary electrophoresis tube proximate to their respective outlets. Another approach is to decrease the distance between the capillary electrophoresis tube outlet and the microfluidic nozzle outlet. Another approach is to orient the capillary electrophoresis tube within the microfluidic nozzle such that the outlet is substantially pointed in the direction of the microfluidic nozzle outlet.

One provided apparatus comprises a capillary electrophoresis tube that has a capillary inlet, a capillary outlet, and a capillary longitudinal axis proximate to the capillary outlet. In some embodiments, a separation buffer is within the capillary electrophoresis tube. In some embodiments, the capillary electrophoresis tube is at least partially filled with a sieving matrix. A first electrode is proximate to and in fluidic connection with the capillary inlet, and a second electrode is proximate to and in fluid connection with the capillary outlet. The apparatus further comprises a microfluidic pump chamber that has an internal region and a pump inlet, wherein the microfluidic pump chamber is connected to an impulsive pump element. The apparatus further comprises a microfluidic nozzle having a nozzle outlet, a tapered internal region proximate to the nozzle outlet, and a nozzle longitudinal axis proximate to the nozzle outlet. The microfluidic nozzle is in fluid connection with the microfluidic pump chamber, wherein the capillary outlet of the capillary electrophoresis tube is located within the tapered internal region of the microfluidic nozzle.

In some embodiments, the capillary outlet terminates between about 5 µm and about 500 µm from the nozzle outlet. In some embodiments, the diameter of the nozzle outlet is between about 5 µm about 200 µm.

In some embodiments, the capillary electrophoresis tube extends through the pump inlet of the microfluidic pump chamber to the tapered internal region of the microfluidic nozzle. In some embodiments, the capillary longitudinal axis of the capillary electrophoresis tube is parallel to the longitudinal axis of the microfluidic nozzle. In some embodiments, the capillary longitudinal axis of the capillary electrophoresis tube extends through the nozzle outlet of the microfluidic nozzle. In some embodiments, the capillary longitudinal axis of the capillary electrophoresis tube is coaxial with the nozzle longitudinal axis of the microfluidic nozzle.

In some embodiments, the capillary electrophoresis tube further comprises a capillary electrophoresis tube tapered region proximate to the capillary outlet. In some embodiments, the apparatus further comprises a spacer configured to create a void space between the capillary electrophoresis tube tapered region and the tapered internal region of the microfluidic nozzle. In some embodiments, the spacer is integrally formed with the capillary electrophoresis tube. In some embodiments, the spacer is integrally formed with the microfluidic nozzle.

In some embodiments, the apparatus further comprises a non-conducting polymer shell surrounding the microfluidic pump chamber and the impulsive pump element. In some embodiments, the apparatus further comprises a metal shell surrounding the microfluidic pump chamber and the impulsive pump element. In some embodiments, the second electrode is connected with the metal shell.

In some embodiments, the apparatus further comprises a sheath flow tube connected with the pump inlet. In some embodiments, the sheath flow tube is in fluidic connection with a sheath flow reservoir. In some embodiments, the second electrode is located within the sheath flow reservoir.

In some embodiments, the apparatus further comprises an analyte within the capillary electrophoresis tube, and a sheath liquid within the microfluidic pump chamber.

In some embodiments, the impulsive pump element comprises a piezoelectric material or a thermoresistive material.

Also provided is an apparatus comprising a capillary electrophoresis tube that has a capillary inlet, a capillary outlet, and a capillary longitudinal axis proximate to the capillary outlet. In some embodiments, a separation buffer is within the capillary electrophoresis tube. In some embodiments, the capillary electrophoresis tube is at least partially filled with a sieving matrix. A first electrode is proximate to and in fluidic connection with the capillary inlet, and a second electrode is proximate to and in fluid connection with the capillary outlet. The apparatus further comprises a microfluidic pump chamber that has an internal region and a pump inlet, wherein the microfluidic pump chamber is connected to an impulsive pump element. The apparatus further comprises a microfluidic nozzle having a nozzle outlet and a nozzle longitudinal axis proximate to the nozzle outlet. The microfluidic nozzle is in fluid connection with the microfluidic pump chamber, wherein the capillary outlet of the capillary electrophoresis tube is located within an internal region of the microfluidic nozzle proximate to the nozzle outlet.

In some embodiments, the capillary outlet terminates between about 5 μm and about 500 μm from the nozzle outlet. In some embodiments, the diameter of the nozzle outlet is between about 5 μm and about 200 μm.

In some embodiments, the capillary longitudinal axis of the capillary electrophoresis tube is parallel to the longitudinal axis of the microfluidic nozzle. In some embodiments, the capillary longitudinal axis of the capillary electrophoresis tube extends through the nozzle outlet of the microfluidic nozzle. In some embodiments, the capillary longitudinal axis of the capillary electrophoresis tube is coaxial with the nozzle longitudinal axis of the microfluidic nozzle.

In some embodiments, the apparatus further comprises a non-conductive polymer shell surrounding the microfluidic pump chamber and the impulsive pump element. In some embodiments, the apparatus further comprises a metal shell surrounding the microfluidic pump chamber and the impulsive pump element. In some embodiments, the second electrode is connected with the metal shell.

In some embodiments, the apparatus further comprises a sheath flow tube connected with the pump inlet. In some embodiments, the sheath flow tube is in fluidic connection with a sheath flow reservoir. In some embodiments, the second electrode is located within the sheath flow reservoir.

In some embodiments, the apparatus further comprises an analyte within the capillary electrophoresis tube, and a sheath liquid within the microfluidic pump chamber.

In some embodiments, the impulsive pump element comprises a piezoelectric material or a thermoresistive material.

Also provided is a method for dispensing an analyte from a capillary electrophoresis tube. The method comprises applying a voltage potential through a capillary electrophoresis tube that has a capillary outlet, and a capillary longitudinal axis proximate to the capillary outlet. In some embodiments, a separation buffer is within the capillary electrophoresis tube. In some embodiments, the capillary electrophoresis tube is at least partially filled with a sieving matrix. The method further comprises impulsively pumping a sheath liquid through a microfluidic pump chamber in fluidic connection with a microfluidic nozzle. The microfluidic nozzle has a nozzle outlet, a tapered internal region proximate to the nozzle outlet, and a nozzle longitudinal axis proximate to the nozzle outlet. The capillary outlet of the capillary electrophoresis tube is located within the tapered internal region of the microfluidic nozzle. The method further comprises mixing a separated analyte with the sheath liquid, wherein the separated analyte exits the capillary electrophoresis tube through the capillary outlet. The mixing of the separated analyte and the sheath liquid is substantially entirely within the tapered internal region of the microfluidic nozzle. The method further comprises dispensing the mixture of the separated analyte and the sheath liquid through the nozzle outlet of the microfluidic nozzle.

In some embodiments, the method further comprises controlling the pressure of the sheath liquid in a sheath liquid reservoir that is in fluidic connection with the microfluidic pump chamber. In some embodiments, the method further comprises controlling the pressure of a capillary electrophoresis solution in a capillary electrophoresis solution reservoir that is in fluidic connection with the capillary outlet.

In some embodiments, the method further comprises flowing a capillary electrophoresis solution through the capillary electrophoresis tube and out of the capillary outlet, wherein the flowing is subsequent to applying the voltage potential.

In some embodiments, the capillary longitudinal axis of the capillary electrophoresis tube is parallel to the longitudinal axis of the microfluidic nozzle. In some embodiments, the capillary longitudinal axis of the capillary electrophoresis tube extends through the nozzle outlet of the microfluidic nozzle. In some embodiments, the capillary longitudinal axis of the capillary electrophoresis tube is coaxial with the nozzle longitudinal axis of the microfluidic nozzle.

In some embodiments, the dispensing of the mixture out of the nozzle outlet creates one or more droplets. In some embodiments, the dispensing of the mixture out of the nozzle outlet creates a stream.

In some embodiments, the dispensing step further comprises contacting the dispensed mixture with a surface. In some embodiments, the surface comprises a hydrophobic material. In some embodiments, the surface comprises a hydrophilic material. In some embodiments, the surface is a blotting membrane. In some embodiments, the method further comprises controlling the position of the surface relative to that of the microfluidic nozzle.

DETAILED DESCRIPTION

Embodiments of the present invention include devices and methods for dispensing material output from a capillary electrophoresis tube. The inventors have assembled a new configuration for a dispensing device that can be used to deliver at high resolution material eluted from a separation channel.

A technical advantage of some embodiments is the enabling of high spatial resolution blotting of separated molecules onto a solid support. The devices and methods described herein can operate with a wide variety of dispensed droplet sizes (e.g., 10 picoliter-10 nanoliter) and frequencies (e.g., 0-10,000 Hz). The dispensing largely does not fragment or otherwise damage biomolecules during the process.

A technical advantage of some embodiments is that the separation column associated with the dispensing device can be physically isolated from a solid support that material is dispensed onto. Because of this separation, no fluid or electrical connection is required between the dispensing device and the solid support. As a result, the solid support has no required electrical properties and can comprise an insulating, conducting, and/or non-conducting material.

Figure 1:
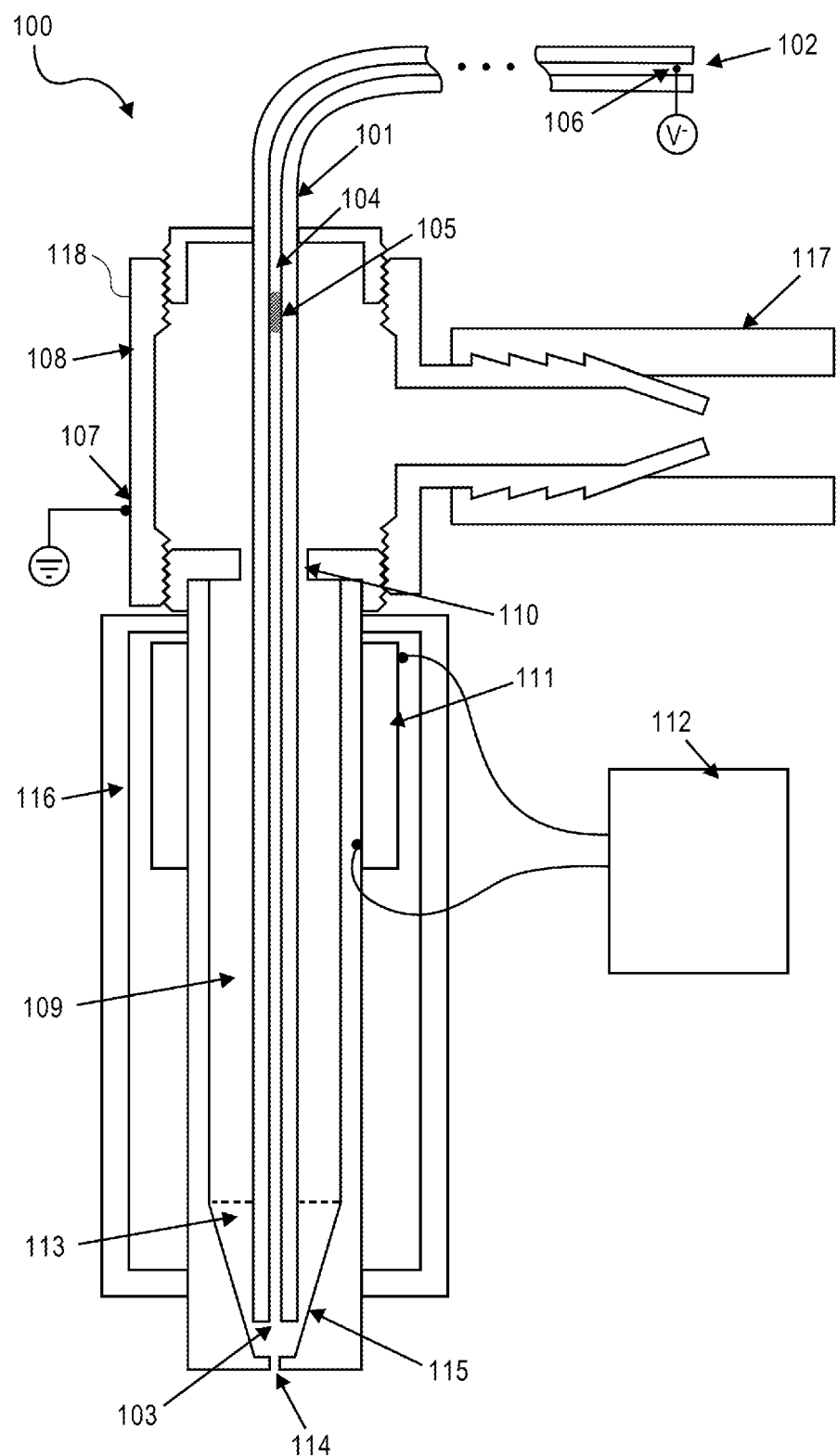
FIG. 1 illustrates one embodiment of a capillary electrophoresis dispensing apparatus.

FIG. 1 illustrates one embodiment. Shown in device 100 is a capillary electrophoresis tube 101 having a capillary inlet 102 and a capillary outlet 103. The interior 104 of the capillary electrophoresis tube can be filled with a separation buffer 105. A first electrode 106 is proximate to and in fluid connection with the capillary inlet 102. A second electrode 107 is connected to an electrically conductive material 108 that is in fluid connection with the capillary outlet 103.

"Fluid connection" refers to a mechanical or physical connection between two or more elements that provides for the transfer between the elements of a flowing substance when present. The flowing substance can be, for example, a gas or liquid material, mixture, solution, dispersion, or suspension. The flowing substance is not required for the fluid connection to exist. In some aspects, an apparatus having a fluid connection can be provided to a user without the flowing substance or fluid, and the fluid can then be separately provided or introduced into the apparatus by the user.

Also provided is a microfluidic pump chamber 109 having a pump inlet 110. The microfluidic pump chamber 109 is connected to an impulsive pump element 111 that is electrically connected to a pump actuator 112. The microfluidic pump chamber 109 is also in fluid connection with a microfluidic nozzle 113 having a nozzle outlet 114.

In some embodiments, and as is shown in FIG. 1, the microfluidic nozzle further comprises a tapered internal region 115 that is proximate to the nozzle outlet. In some embodiments, and as is shown in FIG. 1, the capillary outlet 103 of the capillary electrophoresis tube 101 is located within the tapered internal region 115 of the microfluidic nozzle.

In some embodiments, the electrically conductive material 108 that the second electrode 107 is connected to is a T fitting. In some embodiments, the second electrode 107 is instead connected to an electrically conductive shell 116 that surrounds the microfluidic pump chamber 109 and the impulsive pump element 111.

The shell and/or T fitting can comprise a metal, such as silver, copper, gold, aluminum, molybdenum, zinc, lithium, brass, nickel, iron, tungsten, palladium, platinum, tin, or bronze. In some embodiments, the second electrode 107 is itself proximate to and in fluid connection with the capillary outlet 103.

In some embodiments, the shell 116 that surrounds the microfluidic pump chamber 109 and the impulsive pump element 111 can be a non-conducting, inert, or electrically insulating material. In some embodiments, the shell can be a polymeric material that is non-conducting, inert, or electrically insulating. In some embodiments, the shell can be treated with a coating that is non-conducting, inert, or electrically insulating.

Also provided is a sheath flow tube 117 that is in fluid connection with the pump inlet 110 of the microfluidic pump chamber 109. Sheath liquid can travel through the sheath flow tube 117 and the pump inlet 110 into the microfluidic pump chamber 109 and microfluidic nozzle 113. Sheath liquid supplied through this sheath flow tube can replace sheath liquid that has exited the microfluidic pump through the microfluidic nozzle outlet. The connection of the sheath flow tube and the pump inlet can be through a T fitting 118.

The microfluidic pump can contain a sheath liquid that surrounds the outlet portion of the capillary electrophoresis tube. In some embodiments, the sheath liquid comprises one or more aqueous liquids, one or more organic liquids, or a mixture of these. The pump can act to pressurize the sheath liquid, causing it to exit the pump through the nozzle outlet of the connected microfluidic nozzle. As it exits the microfluidic nozzle outlet, the sheath liquid can entrain material that is output from the capillary electrophoresis tube.

The liquid that exits the microfluidic nozzle can consist entirely of sheath liquid. The liquid that exits the microfluidic nozzle can consist entirely of material that is output from the capillary electrophoresis tube. The material that is output from the capillary electrophoresis tube can include one or more of a capillary electrophoresis tube solution, a buffer, a sieving matrix, a sample, or one or more analytes. In some embodiments, the liquid that exits the microfluidic nozzle comprises a mixture of sheath liquid and material that is output from the capillary electrophoresis tube, wherein the percentage of the mixture that comprises sheath liquid is about 0%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

The sieving matrix of the capillary electrophoresis tube, when optionally present, can comprise nanoparticles, beads, macromolecules, a colloidal crystal, a gel, a polymer solution, or one or more other media. Examples of gels suitable for use in a sieving matrix include those comprising acrylamide or agarose. The sieving gel can include, for example, one or more of sodium dodecyl sulfate (SDS), polyvinylpyrrolidone (PVP), polyethylene oxide (PEO), polylactic acid (PLA), polyethylene glycol (PEG), polydimethylacrylamide (PDMA), acrylamide, polyacrylamide, methylcellulose, hydroxypropylmethyl cellulose (HPMC), hydroxypropyl cellulose (HPC), hydroxyethyl cellulose (HEC), agarose gel, or dextran.

Protein and DNA size-based separation techniques often rely on gels or polymer solutions to resolve populations of biomolecules. These gels and polymer solutions create a random sieving media through which the biomolecules migrate, separating the molecules by size as they pass through the media. The composition and porosity of conventional separation media can be modified to produce pores of different average sizes within the media. The sieving matrix can contain a substantially heterogeneous or substantially homogeneous assortment of pore sizes.

The sieving matrix, when optionally present, can include silica nanoparticles that form a colloidal crystal, providing a separation media which has a substantially monodisperse pore size, based on the monodispersity of the silica colloid size and the crystallization of the colloids. The use of separation media comprising silica nanoparticles is further discussed in U.S. Patent Application Publication No. 2015/0279648A1, as published Oct. 1, 2015, which is entirely incorporated by reference herein for all purposes.

The capillary electrophoresis tube can be formed from, for example, plastic or fused silica. In some embodiments, the diameters of the capillary inlet and the capillary outlet are in a range from about 5 µm to about 500 µm. The diameters of the capillary inlet and outlet can be, for example, in a range between about 5 µm and about 80 µm, between about 10 µm and about 125 µm, between about 15 µm and about 200 µm, between about 20 µm and about 300 µm, or between about 30 µm and about 500 µm. The diameters of the capillary inlet and outlet can be between about 20 µm and about 60 µm, between about 25 µm and about 70 µm, between about 30 µm and about 85 µm, between about 35 µm and about 100 µm, or between about 40 µm and about 125 µm. In some embodiments, the diameters of the capillary inlet and outlet are about 50 µm. In some embodiments, the diameters of the capillary inlet and the capillary outlet are about 1, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 600, 700, 800, 900, or 1000 µm.

The first and second electrodes can be formed from any conducting or semiconducting material. For example, in some embodiments, one or both or the electrodes comprise a metal. In some embodiments, the metal is gold or platinum. For example, one or both of the electrodes can be platinum or can be platinum-plated. One or both of the electrodes can be substantially cylindrical in shape, as in a wire. One or both of the electrodes can also be substantially flattened in shape so as to increase their surface area. The apparatus can further include other electrodes in addition to the first and second electrodes. The additional electrodes can have compositions or configurations identical to or different from those of the first and second electrodes. In some embodiments, multiple electrodes in electrical connection with the apparatus can be controlled independently, simultaneously, or in different combinations in operating the apparatus.

The voltage at the first electrode can be held at a different voltage than that at the second electrode. The difference in voltages can cause analytes in the capillary electrophoresis tube to separate from one another in a technique known as electrophoresis. Electrophoresis is the induced motion of particles suspended in a fluid by an electric field, or as otherwise known in the art. Electrophoresis of positively charged particles (cations) is often called cataphoresis, while electrophoresis of negatively charged particles (anions) is often called anaphoresis.

Motion of analytes or other material within the capillary electrophoresis tube can occur soleley through electrophoresis. There can also a bulk fluid flow through the capillary electophoresis tube that contributes to the motion of analytes or other material. In some embodiments, the analytes or other materials within the capillary electrophoresis tube move only through the action of bulk fluid flow within the tube.

In certain aspects, the electrophoresis systems and methods of the present invention resolve or separate the analyte as a function of the pI of the analyte. The isoelectric point (pI) is the pH at which a particular molecule carries no net electrical charge. Other suitable techniques for resolution or separation include, but are not limited to, electrophoresis, isoelectric focusing, ion exchange chromatography, cation exchange chromatography, and hydrophobic interaction chromatography. Resolution can also be conducted using affinity chromatography, wherein separation results from interaction of one or more analytes with binding moieties such as antibodies, lectins, and aptamers, in the separation bed.

In some embodiments, one or more analytes are separated within the the capillary tube by isoelectric focusing prior to subsequent movement of the analytes within the tube by a bulk fluid flow. It is to be understood that the separated analyte or material can be a portion of all of the analyte or material within the capillary tube. The capillary electrophoresis tube, optional sieving matrix, and related separation process can function to stratify analytes or material prior to their dispensing. In some embodiments, one or more analytes are moved within the capillary tube by a bulk fluid flow prior to their subsequent separation within the tube by isoelectric focusing. In one provided embodiment of a method, an isoelectric focusing step is used to separate one or more analytes within the tube, a bulk fluid flowing step is used to move the one or more analytes into the dispensing apparatus, and a dispensing step is used to dispense the one or more analytes onto a surface.

At least a portion of the microfluidic pump chamber comprises a deformable surface. The deformable surface can be connected to the impulsive pump element. The deformable surface can be configured to expand, to contract, or both. The movement of the deformable surface alters the volume of the pump internal region. As the volume of the pump internal region decreases, liquid contained within the pump internal region can be dispensed through the nozzle outlet of the microfluidic nozzle.

The impulsive pump element can comprise a piezoelectric material. In some embodiments, the impulsive pump element comprises a piezoelectric crystal. In some embodiments, the impulsive pump element comprises lead zirconate titanate. The impulsive pump element can comprise a thermoresistive material. The impulsive pump element can be electrically connected to an impulsive pump actuator. In some embodiments, the impulsive pump actuator can transmit a signal to the impulsive pump element causing it to expand, contract, or expand and contract. The expansion of the impulsive pump element can deform a portion of the microfluidic pump chamber and can result in the dispensing of liquid through the nozzle outlet of the microfluidic nozzle.

A portion of the capillary electrophoresis tube can be located within the pump inlet. In some embodiments, the capillary electrophoresis tube transits through the microfluidic pump chamber with a portion of the electrophoresis tube extending through the pump inlet of the microfluidic pump chamber to the tapered internal region of the microfluidic nozzle.

The nozzle outlet can have any shape that is capable of allowing the formation of droplets of dispensed fluid. The nozzle outlet can have a circular or ovoid shape. The nozzle outlet can have a triangular, rectangular, or other polygonal shape. The nozzle outlet shape can have two or more axes of symmetry. The diameter or major axis of the nozzle outlet can be larger than, equal to, or smaller than the diameter of the capillary outlet. In some embodiments, the diameter of the nozzle outlet is in the range from about 5 μm to about 200 μm. The diameter of the nozzle outlet can be in the range between about 5 μm and about 500 μm. The diameter of the nozzle outlet can be, for example, in a range between about 5 μm and about 80 μm, between about 10 μm and about 125 μm, between about 15 μm and about 200 μm, between about 20 μm and about 300 μm, or between about 30 μm and about 500 μm. The diameter of the nozzle outlet can be between about 20 μm and about 60 μm, between about 25 μm and about 70 μm, between about 30 μm and about 85 μm, between about 35 μm and about 100 μm, or between about 40 μm and about 125 μm. In some embodiments, the diameter of the nozzle outlet is about 50 μm. In some embodiments, the diameter of the nozzle outlet is about 1, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 600, 700, 800, 900, or 1000 μm.

At least a portion of the internal region of microfluidic nozzle is tapered such that the cross-sectional area of the nozzle internal region proximate to the nozzle outlet is smaller than the cross-sectional area of the nozzle internal region proximate to the microfluidic pump chamber. In some embodiments, the entire internal region of the microfluidic nozzle is tapered. In some embodiments, only the portion of the nozzle internal region proximate to the nozzle outlet is tapered. The tapering can be such that the cross-sectional area of the nozzle internal region decreases linearly along the longitudinal axis of the nozzle. The tapering can be such that cross-sectional area of the nozzle internal region decreases nonlinearly along the longitudinal axis of the nozzle. The external surface of the microfluidic nozzle can be tapered as well.

Figure 2:
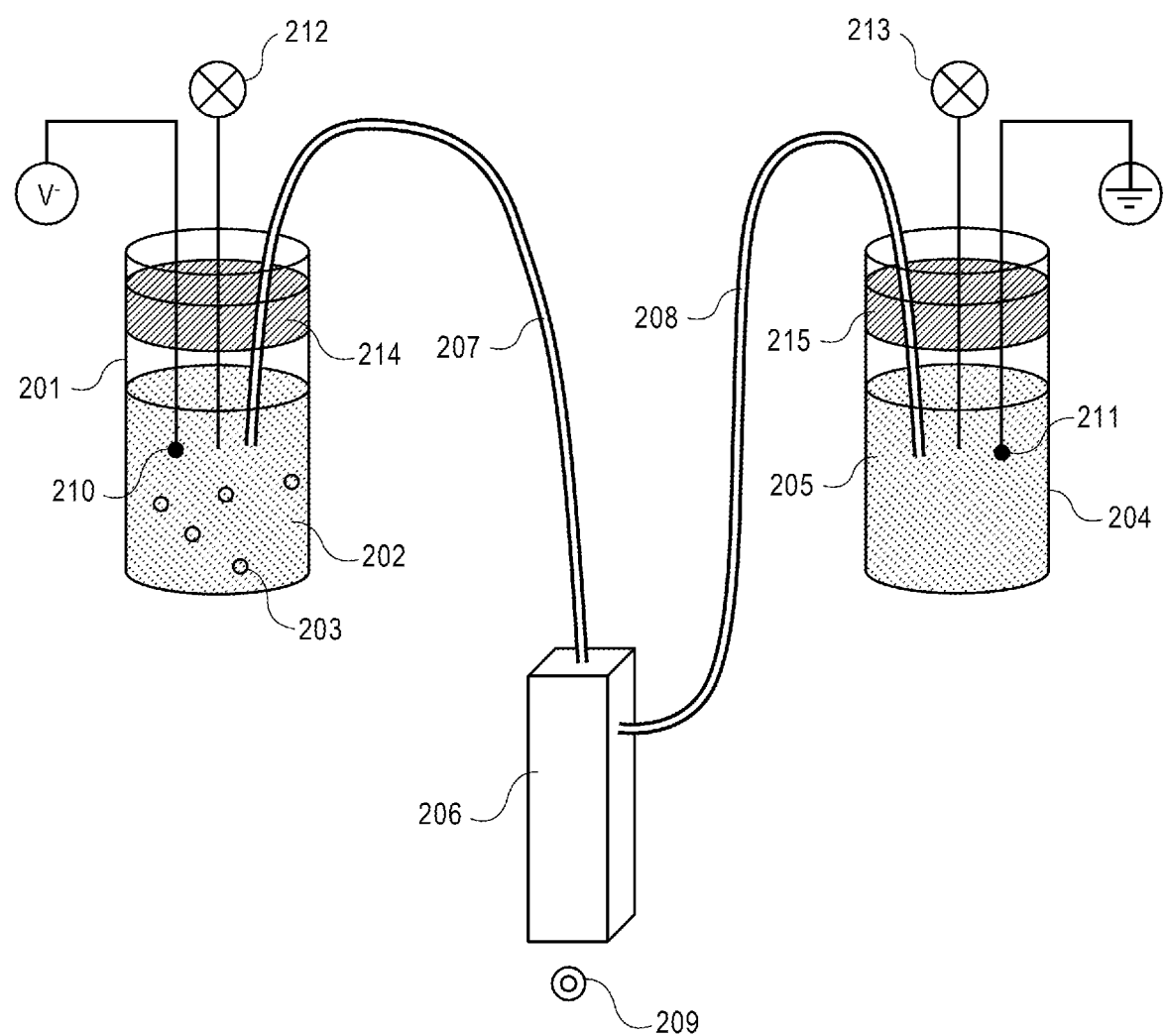
FIG. 2 illustrates a system in accordance with one embodiment of a capillary electrophoresis dispensing apparatus.

FIG. 2 illustrates one embodiment. Shown is a capillary electrophoresis solution reservoir 201 that holds a capillary electrophoresis solution 202. The capillary electrophoresis solution 202 can comprise one or more dissolved analytes 203. The capillary electrophoresis solution 202 is in fluid connection with a dispensing apparatus 206 via a capillary electrophoresis tube 207.

Also shown is a sheath liquid reservoir 204 that holds a sheath liquid 205. The sheath liquid 205 is in fluid connection with the dispensing apparatus 206 via a sheath flow tube 208.

The dispensing apparatus can be configured as in the device 100 of FIG. 1 to dispense droplets 209 that can comprise a mixture of the capillary electrophoresis solution 202 and the sheath liquid 205. A first electrode 210 is in fluid connection with the capillary electrophoresis solution 202. A second electrode 211 is in fluid connection with the sheath liquid 205. In some embodiments, and as is shown in FIG. 2, the system further comprises a first pressure indicator 212 in fluid connection with the capillary electrophoresis solution 202, and a second pressure indicator 213 in fluid connection with the sheath liquid 205.

One or both of the capillary electrophoresis solution reservoir 201 and/or the sheath liquid reservoir 204 can be configured to maintain their respective interior contents at pressures different from that of the exterior pressure. In this way, a pressure gradient can be maintained for the capillary electrophoresis solution 202 within the capillary electrophoresis tube 207. Similarly, a pressure gradient can be maintained for the sheath liquid 205 within the sheath flow tube 208.

The system can further comprise one or more devices for controlling the pressure of the capillary electrophoresis solution 202 and/or the sheath liquid 205 within their respective reservoirs 201 and 204. In some embodiments, at least a portion of the surfaces of the capillary electrophoresis solution reservoir 201 and/or the sheath liquid reservoir 204 are deformable such that compression or relaxation of the reservoirs increases or decreases the pressures, respectively, of the liquids held within. In some embodiments, the capillary electrophoresis solution 202 and/or the sheath liquid 205 are held within first subchambers of their respective reservoirs 201 and 204. In some embodiments, and as shown in FIG. 2, one or more pistons 214 and 215 exert mechanical pressure on the first subchambers to control the pressures of the liquids held within. In some embodiments, the capillary electrophoresis solution reservoir 201 and/or the sheath liquid reservoir 204 further comprise second subchambers adjacent to the first subchambers. In some embodiments, controlling the volume of a fluid within these second subchambers exerts hydraulic pressure on the first subchambers to control the pressures of the liquids held within. The control of the pressures of the capillary electrophoresis solution 202 and/or the sheath liquid 205 can further comprise measuring the respective pressures with the pressure indicators capillary electrophoresis solution 202 and/or the sheath liquid 205 within their respective reservoirs 201 and 204 with the pressure indicators 212 and 213.

Figure 3:
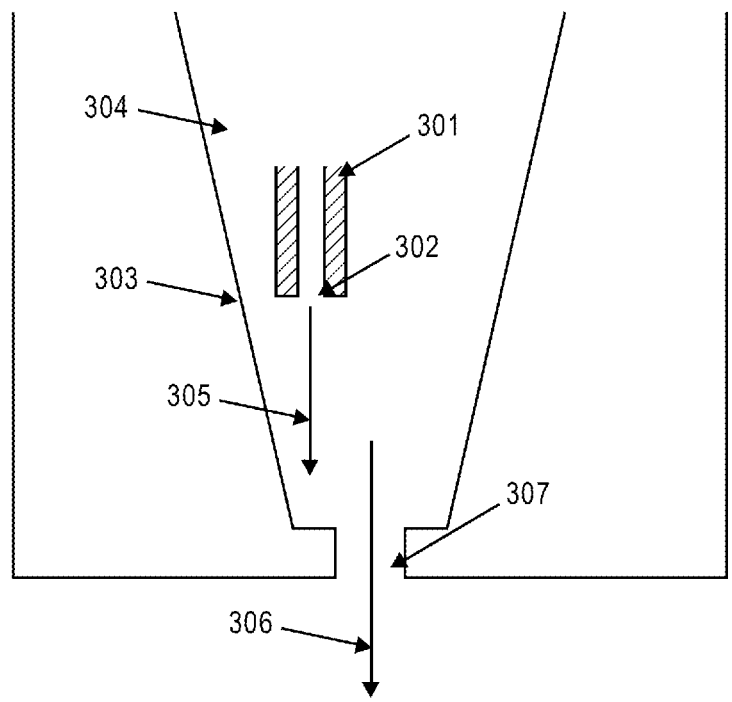
FIG. 3 is a close-up illustration of the tapered internal region of the microfluidic nozzle of the dispensing apparatus, showing one embodiment in which the capillary longitudinal axis of the capillary electrophoresis tube is parallel to the nozzle longitudinal axis of the microfluidic nozzle.

FIG. 3 illustrates an orientation of a portion of a capillary electrophoresis tube 301 with a capillary outlet 302 within a tapered internal region 303 of a microfluidic nozzle 304. A capillary longitudinal axis 305 is the longitudinal axis of the portion of the capillary electrophoresis tube 301 that is proximate to the capillary outlet 302. A nozzle longitudinal axis 306 is the longitudinal axis of the portion of the tapered internal region 303 that is proximate to a nozzle outlet 307. In some embodiments, and as is shown in FIG. 3, the capillary longitudinal axis 305 is parallel to the nozzle longitudinal axis 306.

Figure 4:
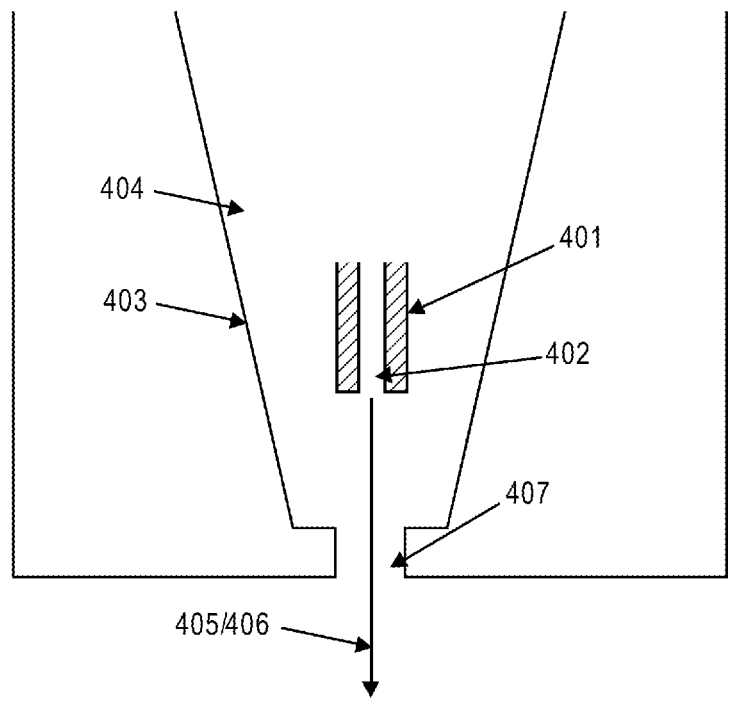
FIG. 4 is a close-up illustration of the tapered internal region of the microfluidic nozzle of the dispensing apparatus, showing one embodiment in which the capillary longitudinal axis of the capillary electrophoresis tube is coaxial with the nozzle longitudinal axis of the microfluidic nozzle.

FIG. 4 illustrates an orientation of a portion of a capillary electrophoresis tube 401 with a capillary outlet 402 within a tapered internal region 403 of a microfluidic nozzle 404. A capillary longitudinal axis 405 is the longitudinal axis of the portion of the capillary electrophoresis tube 401 that is proximate to the capillary outlet 402. A nozzle longitudinal axis 406 is the longitudinal axis of the portion of the tapered internal region 403 that is proximate to a nozzle outlet 407. In some embodiments, and as is shown in FIG. 4, the capillary longitudinal axis 405 is coaxial with the nozzle longitudinal axis 406.

Figure 5:
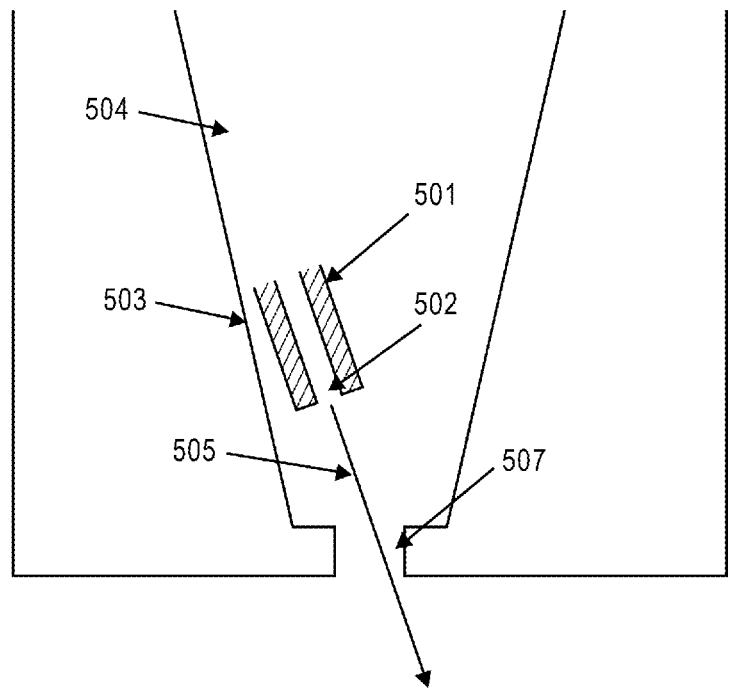
FIG. 5 is a close-up illustration of the tapered internal region of the microfluidic nozzle of the dispensing apparatus, showing one embodiment in which the capillary longitudinal axis of the capillary electrophoresis tube extends through the nozzle outlet of the microfluidic nozzle.

FIG. 5 illustrates an orientation of a portion of a capillary electrophoresis tube 501 with a capillary outlet 502 within a tapered internal region 503 of a microfluidic nozzle 504. A capillary longitudinal axis 505 is the longitudinal axis of the portion of the capillary electrophoresis tube 501 that is proximate to the capillary outlet 502. In some embodiments, and as is shown in FIG. 5, the capillary longitudinal axis 505 extends through a nozzle outlet 507 of the microfluidic nozzle 504.

As separated material exits the capillary electrophoresis tube through the capillary outlet, the material is exposed to the sheath liquid and mixes with it prior to being dispensed through the nozzle outlet in the form of a mixture. The effective volume for this mixing is determined in part by the direction of flow for material exiting the capillary electrophoresis tube. If the capillary outlet were pointed away from or perpendicular to the nozzle outlet, the effective mixing volume would be increased because the eluted material can flow in a direction opposite to that of dispensing. This would dilute the eluted material within the sheath liquid and increase the likelihood that material eluted from the capillary electrophoresis tube at different times can be present in the same mixture dispensed through the nozzle outlet. In either case, the result will be an undesirable decrease in the concentration and/or resolution of dispensed separated material.

A technical advantage of the embodiments illustrated in FIGS. 3, 4, and 5 is that a bulk fluid flow of material exiting the capillary electrophoresis tube will be traveling in a direction substantially towards the nozzle outlet. This has the effect of reducing the effective mixing volume with the sheath liquid and increasing the concentration and/or resolution of dispensed separated material.

The movement of material within the microfluidic nozzle is determined in part by the presence, directions, and magnitudes of sheath liquid flow, bulk fluid flow output from the capillary electrophoresis tube, and an electrical field within the capillary electrophoresis tube and the microfluidic nozzle. In some embodiments, the contribution of bulk fluid flow is greater than that of an electrical field, and accordingly the movement of material within the microfluidic nozzle is in a direction substantially towards the nozzle outlet.

In some embodiments, portions of the capillary electrophoresis tube internal and/or external to the microfluidic pump chamber are coaxial with the portion of the capillary electrophoresis tube proximate to the capillary outlet. In some embodiments, portions of the capillary electrophoresis tube internal and/or external to the microfluidic pump chamber are not coaxial with the portion of the capillary electrophoresis tube proximate to the capillary outlet.

In some embodiments, the capillary outlet terminates in a range between about 5 µm and about 500 µm from the nozzle outlet. The capillary outlet can terminate, for example, in a range between about 5 µm and about 80 µm, between about 10 µm and about 125 µm, between about 15 µm and about 200 µm, between about 20 µm and about 300 µm, or between about 30 µm and about 500 µm from the nozzle outlet. The capillary outlet can terminate in a range between about 20 µm and about 60 µm, between about 25 µm and about 70 µm, between about 30 µm and about 85 µm, between about 35 µm and about 100 µm, or between about 40 µm and about 125 µm from the nozzle outlet. In some embodiments, the capillary outlet terminates about 50 µm from the nozzle outlet.

The portion of the capillary electrophoresis tube proximate to the capillary outlet can be tapered such that the cross-sectional area of the capillary electrophoresis tube proximate to the capillary outlet is smaller than the cross-sectional area of the capillary electrophoresis tube proximate to the microfluidic pump chamber. The tapering can be such that the cross-sectional area of the capillary electrophoresis tube decreases linearly along the capillary longitudinal axis. The tapering can be such that cross-sectional area of the capillary electrophoresis tube decreases nonlinearly along the capillary longitudinal axis.

Figure 6:
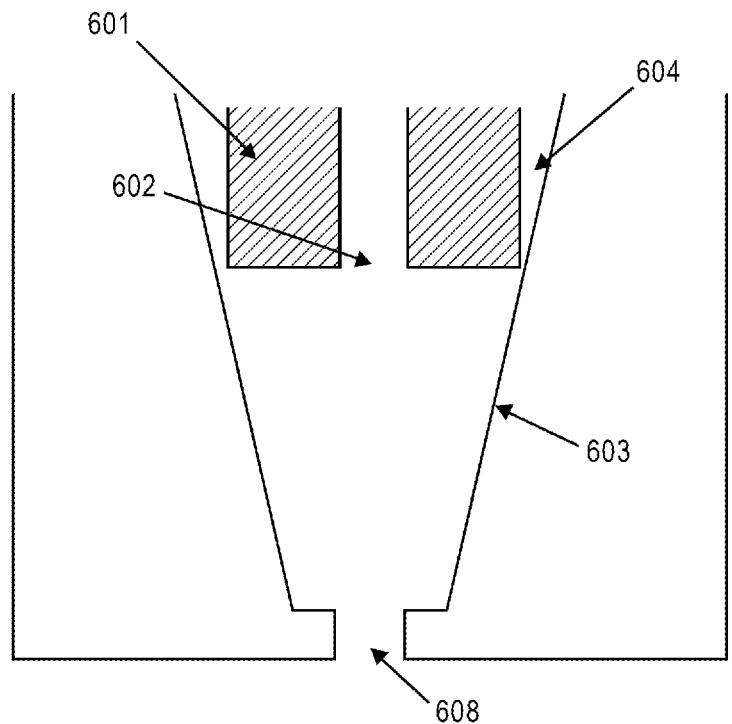
FIG. 6 is a close-up illustration of the tapered internal region of the microfluidic nozzle of the dispensing apparatus, showing one embodiment in which the capillary outlet of the capillary electrophoresis tube is located within the tapered internal region of the microfluidic nozzle.

FIG. 6 illustrates a configuration of a capillary electrophoresis tube outlet region. A portion of a capillary electrophoresis tube 601 with a capillary outlet 602 terminates within a tapered internal region 603 of a microfluidic nozzle 604.

Figure 7:
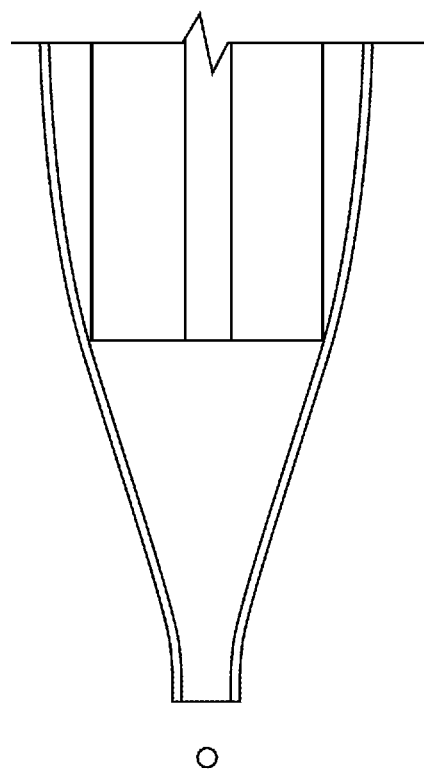
FIG. 7 is a stroboscopic image showing successful droplet dispensing with a capillary located concentrically within a piezoelectric inkjet dispenser.

FIG. 7 is a stroboscopic image showing successful droplet dispensing with a capillary located concentrically within a piezoelectric inkjet dispenser as illustrated in FIG. 6.

Figure 8:
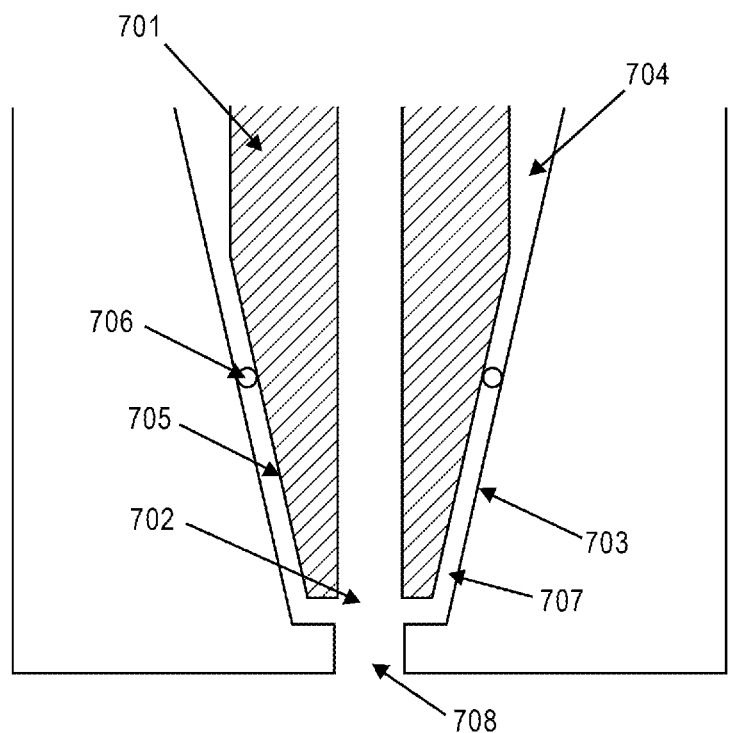
FIG. 8 is a close-up illustration of the tapered internal region of the microfluidic nozzle of the dispensing apparatus, showing one embodiment in which the capillary outlet of the capillary electrophoresis tube is located within the tapered internal region of the microfluidic nozzle, and the capillary electrophoresis tube comprises a capillary tapered region proximate to the capillary outlet.

FIG. 8 illustrates a configuration of a capillary electrophoresis tube outlet region. A portion of a capillary electrophoresis tube 701 with a capillary outlet 702 terminates within a tapered internal region 703 of a microfluidic nozzle 704. The capillary electrophoresis tube 701 comprises a capillary electrophoresis tube tapered region 705 and a spacer 706 configured to create a void space 707 between the capillary electrophoresis tube tapered region 705 and the tapered internal region 703 of the microfluidic nozzle 704. As is shown in FIGS. 6 and 8, the use of a capillary electrophoresis tube tapered region allows the capillary outlet 602/702 to be positioned closer to the nozzle outlet 608/708.

Figure 9:
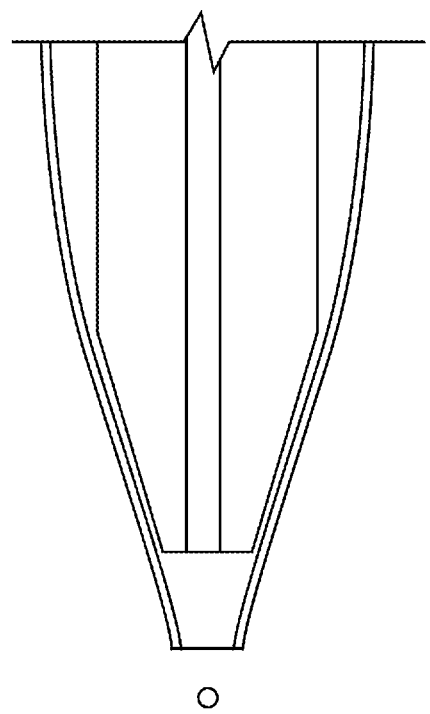
FIG. 9 is a stroboscopic image showing successful droplet dispensing with a tapered capillary located concentrically within a piezoelectric inkjet dispenser.

FIG. 9 is a stroboscopic image showing successful droplet dispensing with a tapered capillary located concentrically within a piezoelectric inkjet dispenser as illustrated in FIG.

8. The tapered capillary shown in FIGS. 8 and 9 can be located significantly closer to the outlet of the dispenser than the blunt-end standard capillary of FIGS. 6 and 7, which can enable better separation resolution. This improved resolution retention can be due to a significant reduction in mixing volume analytes are exposed to between the separation column and the jetting orifice.

As separated material exits the capillary electrophorese tube through the capillary outlet, the material is exposed to the sheath liquid and mixes with it prior to being dispensed through the nozzle outlet in the form of a mixture. The effective volume for this mixing is determined in part by the distance between the capillary outlet and the nozzle outlet. If the capillary outlet were located at a greater distance from the nozzle outlet, the effective mixing volume would be increased. This would dilute the eluted material within the sheath liquid, and increase the likelihood that material eluted from the capillary electrophoresis tube at different times can be present in the same mixture dispensed through the nozzle outlet. In either case, the result will be an undesirable decrease in the concentration and/or resolution of dispensed separated material.

A technical advantage of the embodiment illustrated in FIGS. 8 and 9 is that material exiting the capillary electrophoresis tube will travel along a shorter path from the capillary outlet to the nozzle outlet. This has the effect of reducing the effective mixing volume with the sheath liquid and increasing the concentration and/or resolution of dispensed separated material.

Figure 10:
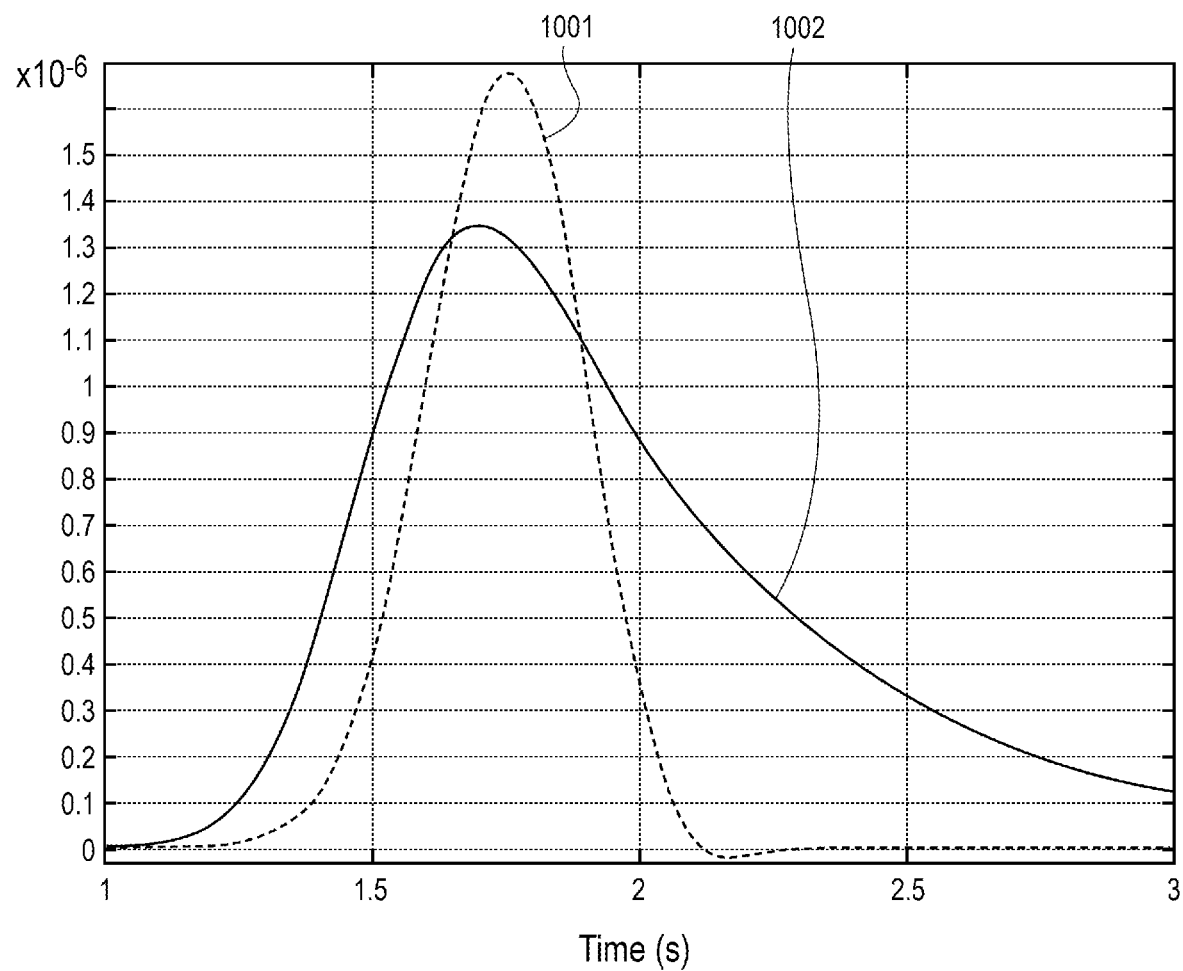
FIG. 10 is a graph of the predicted output signals of capillary inkjet dispensers using standard and tapered capillaries.

FIG. 10 is a graph of predicted output signals for capillary inkjet dispensers using tapered and standard capillaries. The data trends in the graph were generated from finite element analyses using software from COMSOL (Burlington, Mass.). The simulations of these analyses were carried out using geometry as shown in FIGS. 6-9, and an analyte input with a Gaussian distribution having a standard deviation of 0.1 seconds. The trends of the graph show the sharper resolution associated with dispensing using a tapered capillary 1001 versus a standard capillary 1002.

A spacer can be used to locate the capillary electrophoresis tube within the microfluidic nozzle. The spacer can create a void space between the capillary electrophoresis tube tapered region and the internal tapered region of the microfluidic nozzle. The void space created can allow the sheath liquid to flow from the microfluidic pump chamber to the region of the microfluidic nozzle proximate to the capillary outlet and the nozzle outlet. In some embodiments, the spacer is an element of the capillary electrophoresis tube, that is, integrally formed with the capillary electrophoresis tube. In some embodiments, the spacer is an element of the microfluidic nozzle, that is, integrally formed with the microfluidic nozzle. "Integrally formed" refers to two or more parts or elements that are formed or manufactured together as a single piece rather than being formed separately and then subsequently joined or assembled. In some embodiments, the spacer is a washer. In some embodiments, the spacer is a conical washer, a curved disc spring washer, or a split washer.

The capillary electrophoresis tube can be used to separate one or more analytes moving within the tube. An "analyte" includes a substance of interest such as a biomolecule. Biomolecules are molecules of a type typically found in a biological system, whether such molecule is naturally occurring or the result of some external disturbance of the system (e.g., a disease, poisoning, genetic manipulation, etc.), as well as synthetic analogs and derivatives thereof. Non-limiting examples of biomolecules include amino acids (naturally occurring or synthetic), peptides, polypeptides, glycosylated and unglycosylated proteins (e.g., polyclonal and monoclonal antibodies, receptors, interferons, enzymes, etc.), nucleosides, nucleotides, oligonucleotides (e.g., DNA, RNA, PNA oligos), polynucleotides (e.g., DNA, cDNA, RNA, etc.), carbohydrates, hormones, haptens, steroids, toxins, etc. Biomolecules can be isolated from natural sources, or they can be synthetic. The analyte can be, for example, an enzyme or other protein. The analyte can be a peptide or a polypeptide. The analyte can be an antibody or a fragment of an antibody. The analyte can be a nucleic acid molecule. The analyte can include deoxyribonucleic acids (DNA) or ribonucleic acids (RNA). The analyte can be a polynucleotide or other polymer.

The analytes can thus be, for example, proteins, nucleic acids, carbohydrates, lipids, or any other type of molecule. In some embodiments, the analytes are proteins that are present in the capillary electrophoresis tube in their native state. In some embodiments, the analytes are proteins that have been mixed with sodium dodecyl sulfate, sodium deoxycholate, nonyl phenoxypolyethoxylethanol, TRITON X-100™, or other ionic detergents or lysis buffers to cause their partial or complete denaturation.

A voltage potential can be applied through the capillary electrophoresis tube between the first and second electrodes. The power for applying a voltage can supply an electric field having voltages of about 1 V/cm to 2000 V/cm. In some embodiments, the voltage is about 1, 10, 20, 30, 40, 50, 60, 70, 80, 90, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000 V/cm. Higher voltages can also be used, depending on the particular separation method.

The dispensing can generate the formation of a continuous, semi-continuous, or discontinuous stream exiting the nozzle outlet. The dispensing can generate the formation of droplets exiting the nozzle outlet. The droplets can have volumes in the range from about 10 picoliter to about 10 nanoliter. The frequency of the droplets can be in a range from 0 to about 10,000 Hz.

The term "droplet" refers to a small volume of liquid, typically with a spherical shape, encapsulated by an immiscible fluid, such as a continuous phase or carrier liquid of an emulsion. In some embodiments, the volume of a droplet and/or the average volume of droplets is, for example, less than about one microliter (or between about one microliter and one nanoliter or between about one microliter and one picoliter), less than about one nanoliter (or between about one nanoliter and one picoliter), or less than about one picoliter (or between about one picoliter and one femtoliter), among others. In some embodiments, a droplet has a diameter (or an average diameter) of less than about 1000, 100, or 10 μm, or of about 1000 to 10 μm, among others. A droplet can be spherical or nonspherical. A droplet can be a simple droplet or a compound droplet, that is, a droplet in which at least one droplet encapsulates at least one other droplet.

The droplets can be monodisperse, that is, of at least generally uniform size, or can be polydisperse, that is, of various sizes. If monodisperse, the droplets can, for example, vary in volume by a standard deviation that is less than about plus or minus 100%, 50%, 20%, 10%, 5%, 2%, or 1% of the average droplet volume.

The droplets or stream once dispensed can be contacted with a surface. In some embodiments, the surface comprises an electrically insulating material. In some embodiments, the surface comprises an electrically conductive material. In some embodiments, the nozzle outlet contacts the surface. In some embodiments, the nozzle outlet does not contact the surface.

In some embodiments, the surface is located about 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, or 100 mm from the nozzle outlet. The surface can be positioned perpendicular to the nozzle longitudinal axis. The surface can be positioned at an acute angle to the nozzle longitudinal axis.

Figure 11:
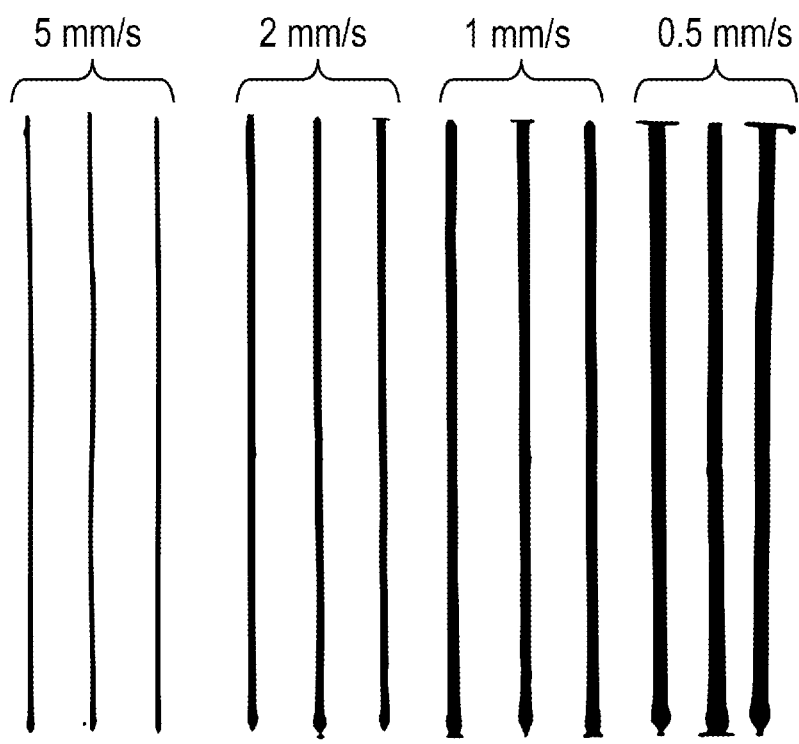
FIG. 11 is an image of triplicate traces created by dispensing 100 drops/second onto a nitrocellulose membrane moving at 5, 2, 1, and 0.5 mm/second.

FIG. 11 is an image of triplicate traces created by dispensing 100 drops/second onto a nitrocellulose membrane moving at 5, 2, 1, and 0.5 mm/second. The dispensed droplets include SAv-800CW dye that can be readily visualized. Each set of triplicate traces shown demonstrates the uniformity and consistency of dispensing that can be achieved with the provided devices and methods. Also, the differences in line thicknesses and dye intensities between the four different triplicate sets show the ability to control dispensing amounts.

In some embodiments, the surface comprises a hydrophilic material. In some embodiments, the surface comprises a hydrophobic material. In some embodiments, the degree of hydrophobicity of the surface affects the surface area of droplets once contacted with the surface. In general, for aqueous droplets, as the hydrophobicity of the surface increases, the contact angle of the droplets with the surface will decrease. This decreased contact angle can allow the distances between adjacent droplets on the surface to be reduced while still preventing droplets from coalescing or otherwise combining with one another. In this way, the use of a hydrophobic surface material can enable a greater concentration of distinct droplets to be dispensed onto the surface. Also, for each individual droplet, the concentration of dispensed material per unit of area of the contacted surface material will increase. In some embodiments, this increased concentration can lead to greater signal intensities for applications such as Western blotting.

In some embodiments, the surface material is selected such that adjacent droplets dispensed onto the surface remain distinct. These embodiments can generate dispensed patterns that maintain the resolution of the separation of material within the capillary electrophoresis tube and the dispensing apparatus. In some embodiments, the surface material is selected such that adjacent droplets dispensed onto the surface coalesce. Through movement of one or both of the surface and/or the dispensing apparatus during dispensing, these embodiments can generate dispensed patterns that are continuous or semi-continuous linear, curved, or semi-curved representations of the separation of material within the capillary electrophoresis tube.

Figure 12:
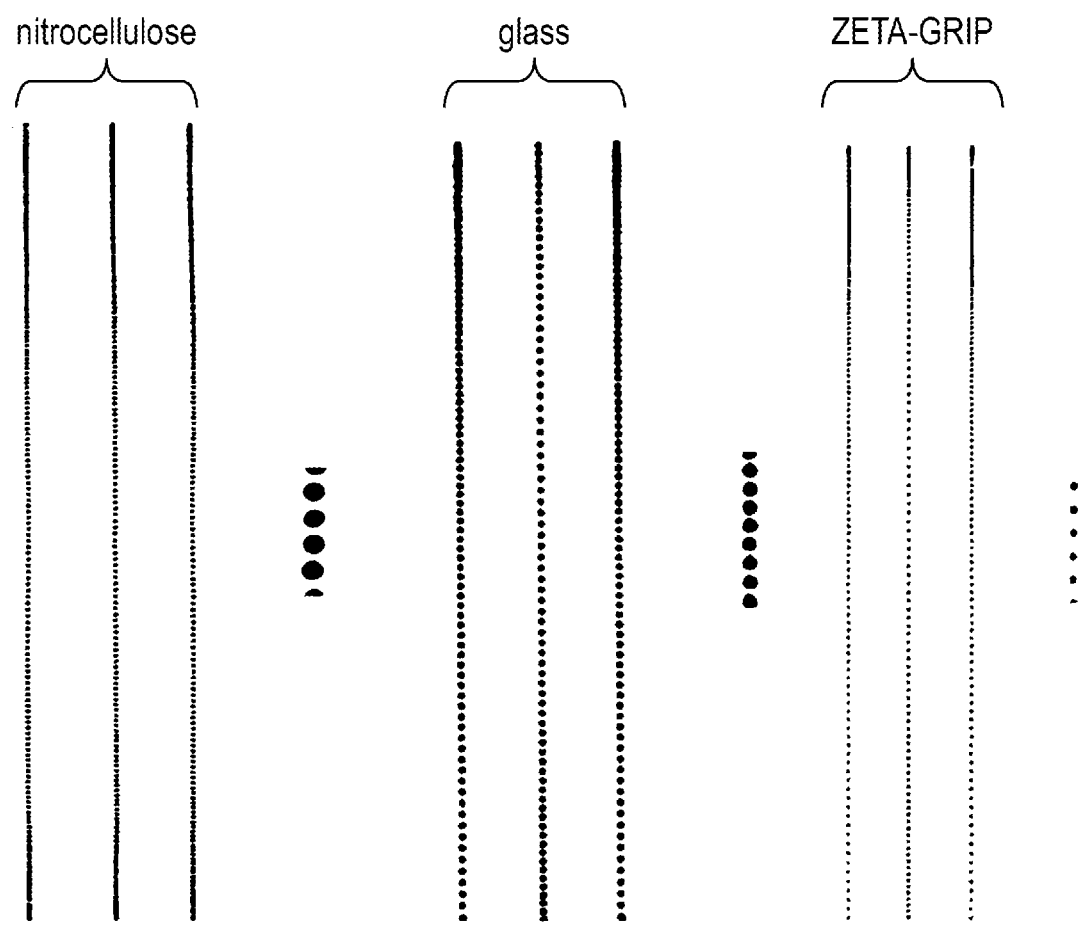
FIG. 12 is an image of triplicate traces created by dispensing drops onto a nitrocellulose membrane, a nitrocellulose on glass membrane, and a ZETA-GRIP™ hydrophobic membrane.

FIG. 12 is an image of triplicate traces created by dispensing drops onto three different surface materials. The left three traces show drops after dispensing onto a nitrocellulose membrane, the middle traces show drops after dispensing onto a nitrocellulose on glass membrane, and the right traces show drops after dispensing onto a ZETA-GRIP™ hydrophobic membrane. Within each set, the consistency among the triplicate repeats again demonstrates to reproducibility of the provided devices and methods. In comparing results from dispensing onto the three different materials, it can be seen that the hydrophobic membrane provides the smallest dispensed drop diameters, and as a result, the highest signal intensity relative to background.

Figure 13:
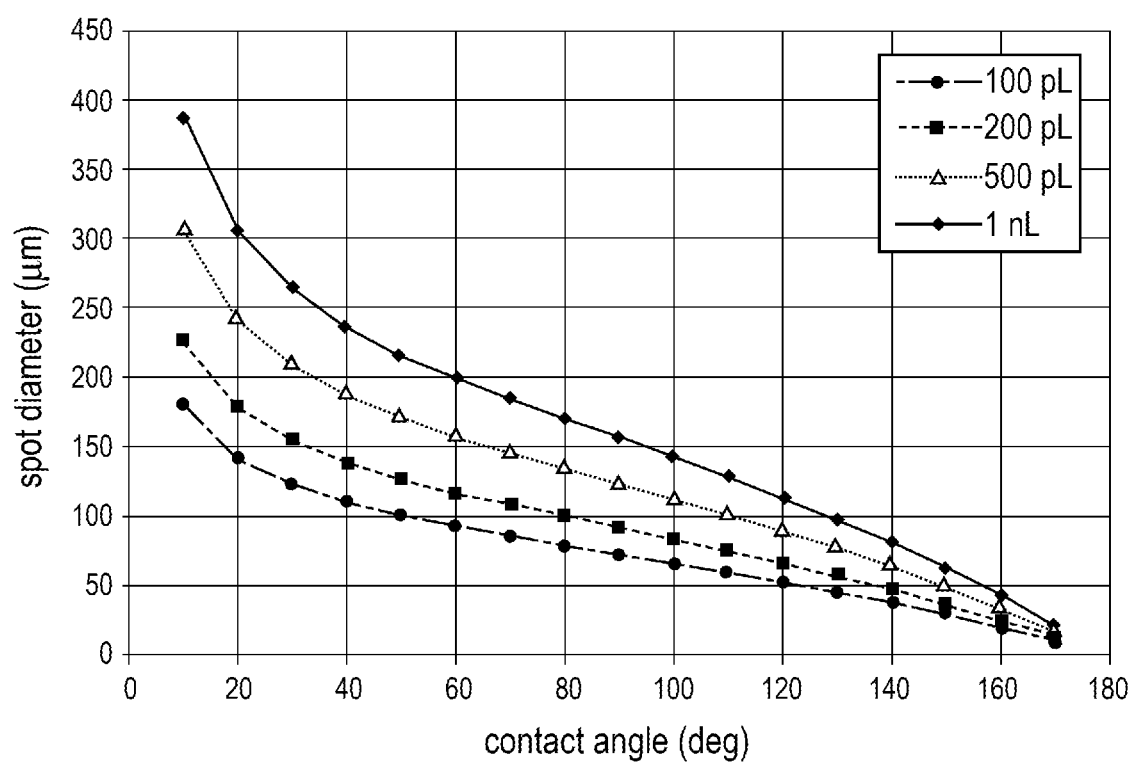
FIG. 13 is a graph of calculated spot diameters versus substrate contact angles for dispensed drops of various volumes.

FIG. 13 a graph of calculated spot diameters versus substrate contact angles for dispensed drops of various volumes. "Contact angle" refers to an angle formed between a horizontal solid surface and the liquid surface of a droplet maintaining a lens shape when placed on the solid surface. The lens shape and contact angle are characteristic of the liquid and solid surface properties. As the hydrophobicity of a solid surface increases, its water contact angle will also increase. The trends in the graph demonstrate that for these increasing water contact angles, the average diameters of dispensed drops will decrease. Additionally, for a surface with a given hydrophobicity and contact angle, the spot diameter can also be controlled by varying the volumes of the dispensed drops, with smaller droplet volumes resulting in smaller spot diameters.

In some embodiments, the surface is a component of a fraction collection device. In some embodiments, the surface is located within a well of a microwell plate. The microwell plate can comprise an array of a plurality of wells. The number of wells arrayed on the microwell plate can be, for example, 6, 24, 96, 384, 1536, 3456, or 9600, or more.

In some embodiments, the surface is a blotting membrane that can be useful for performing a Western immunoassay or other membrane analysis methods such as Northern blotting and Southern blotting. The method can further comprise applying a detection reagent to such a blotting membrane. The detection reagent can be an antibody such as a primary or secondary antibody.

The term "antibody" includes a polypeptide encoded by an immunoglobulin gene or functional fragments thereof that specifically binds and recognizes an antigen. Immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. The term antibody activity, or antibody function, refers to specific binding of the antibody to the antibody target.

A primary antibody will be understood by one of skill to refer to an antibody or fragment thereof that specifically binds to an analyte (e.g., substance, antigen, component) of interest. The primary antibody can further comprise a tag, e.g., for recognition by a secondary antibody or associated binding protein (e.g., green fluorescent protein (GFP), biotin, or strepavidin).

A secondary antibody refers to an antibody that specifically binds to a primary antibody. A secondary antibody can be specific for the primary antibody (e.g., specific for primary antibodies derived from a particular species) or a tag on the primary antibody (e.g., GFP, biotin, or strepavidin). A secondary antibody can be bispecific, e.g., with one variable region specific for a primary antibody, and a second variable region specific for a bridge antigen.

Blotting membranes can comprise, for example, nitrocellulose, nylon, polyvinylidene difluoride, or combinations of one or more of these materials. The blotting membrane can further comprise a support material. The support material can be, for example, glass, plastic, metal, ceramic or other inert surface.

The provided method can further comprise moving the position of the surface relative to that of the dispensing device. The moving can comprise changing the location of the surface as the dispensing device is stationary. The moving can comprise changing the location of the dispensing device and the surface is stationary. The moving can comprise changing the locations of both the surface and the dispensing device. The moving can comprise changing the location of the surface in one direction and changing the location of the dispensing device in an orthogonal direction.

The moving of the surface relative to the dispensing device can comprise the use of motors. The dispensing device can also or alternatively be moved relative to the surface. This movement of the dispensing device can also include the use of motors. The motors can be, for example, stepper motors, small brushed direct current (DC) motors, or brushless DC motors. The motors can be elements of a robotic apparatus that is programmed or otherwise configured to automate and/or regulate the operation of the motors.

The method can utilize a computing apparatus that is programmed or otherwise configured to automate and/or regulate one or more steps of the method provided herein. Some embodiments provide machine executable code in a non-transitory storage medium that, when executed by a computing apparatus, implements any of the methods described herein. In some embodiments, the computing apparatus operates one or more of the pressure of the capillary electrophoresis solution reservoir, the pressure of the sheath liquid reservoir, the flow of liquid through the capillary electrophoresis tube, the flow of liquid through the sheath flow tube, the activity of the impulsive pump actuator, the moving of the surface, or the moving of the dispensing apparatus.

The term "automated" refers to a device, action, or method carried out by a machine or computer without direct human control. In some embodiments, the device and method described herein is operated in an automated fashion. In some embodiments, the automated method has subjective start and end points, thus the term does not imply that all steps of the operation are carried out automatically.

Also provided are devices that comprise a plurality of dispensing units. The dispensing units can be configured in a linear array. The dispensing units can be configured in a 2-dimensional array. In some embodiments, the device comprises 1, 2, 4, 8, 12, or more dispensing units. Some or all of the dispensing units can each be connected to the same supply of sheath liquid. Some or all of the dispensing units can each be connected to different supplies of sheath liquid. Each of the different sheath liquid supplies can include the same or different sheath liquid compositions. Some or all of the dispensing units can each be connected to the same capillary electrophoresis solution reservoir. Some or all of the dispensing units can each be connected to different capillary electrophoresis solution reservoirs. Each of the different capillary electrophoresis solution reservoirs can include the same or different capillary electrophoresis solution compositions.

Figure 14:
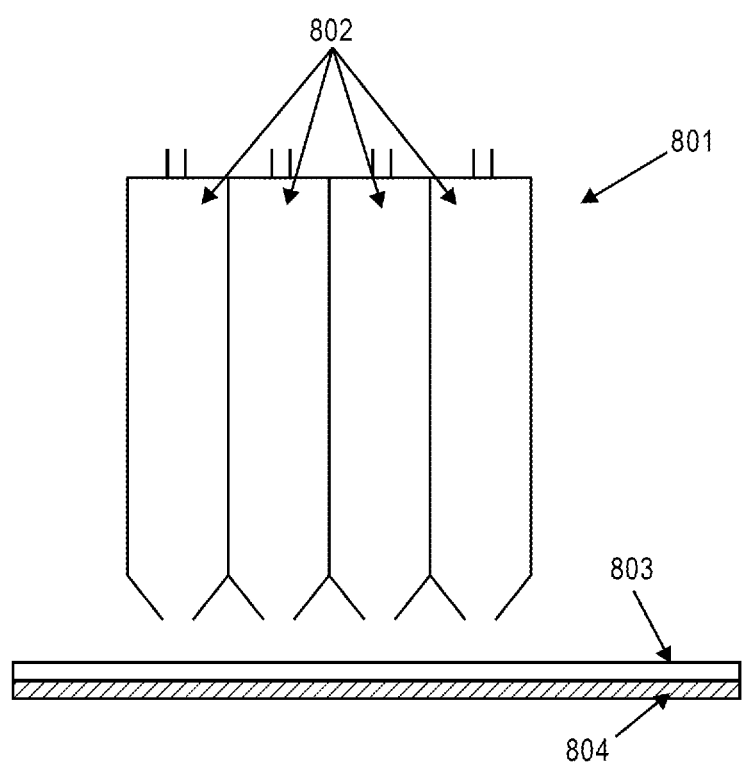
FIG. 14 illustrates one embodiment of a capillary electrophoresis dispensing system with an array of four dispensing units used to dispense material onto a membrane surface connected to a support surface.

FIG. 14 illustrates a system with an array 801 of four dispensing units 802 positioned above a dispensed mixture receiving surface 803 that is connected to a support surface 804.

The devices and methods provided herein can be used for dispensing separated material at high-resolution. The devices and methods can also be used to dispense material at high concentrations and/or low volumes. In some embodiments, the dispensed material is not separated by a capillary electrophoresis column but is instead output into the sheath liquid proximate to the nozzle outlet for subsequent dispensing. In this way, the devices and methods can be used to deliver discrete aliquots of materials at high concentration and/or low volume. The aliquots can be of a uniform material or of a mixture of materials that are at least partially combined within the provided dispensing device. The dispensed material can include, for example, antibodies, blocking reagents, or other components of chemical or biological processes. The devices and methods can be used to deliver material to downstream process such as a separation process, a non-separation process such as mass spectrometry, or a microfluidic droplet chemistry process.

Figure 15:
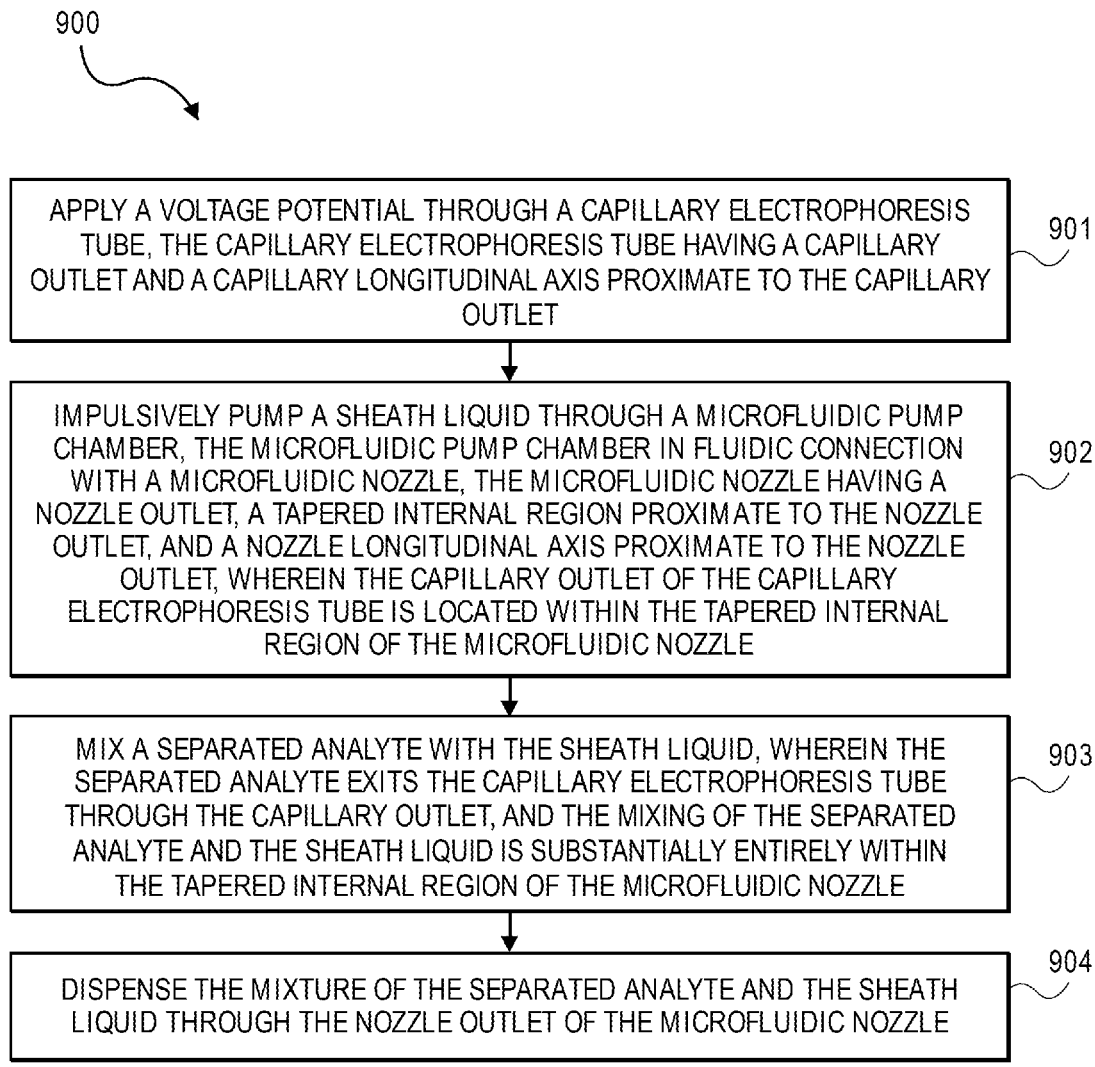
FIG. 15 is a flowchart of a process in accordance with an embodiment.

FIG. 15 is a flowchart of a process 900 in accordance with an embodiment. In operation 901, a voltage potential is applied through a capillary electrophoresis tube, the capillary electrophoresis tube having a capillary outlet, and a capillary longitudinal axis proximate to the capillary outlet. In operation 902, a sheath liquid is impulsively pumped through a microfluidic pump chamber, the microfluidic pump chamber in fluidic connection with a microfluidic nozzle, the microfluidic nozzle having a nozzle outlet, a tapered internal region proximate to the nozzle outlet, and a nozzle longitudinal axis proximate to the nozzle outlet, wherein the capillary outlet of the capillary electrophoresis tube is located within the tapered internal region of the microfluidic nozzle. In operation 903, a separated analyte is mixed with the sheath liquid, wherein the separated analyte exits the capillary electrophoresis tube through the capillary outlet, and the mixing of the separated analyte and the sheath liquid is substantially entirely within the tapered internal region of the microfluidic nozzle. In operation 904, the mixture of the separated analyte and the sheath liquid is dispensed through the nozzle outlet of the microfluidic nozzle.

Systems that incorporate the apparatus are also provided. Systems can include, for example, a power supply and power regulator to control the current and/or voltage to the first and second electrodes and the impulsive pump actuator. Additionally, pressure sources for regulating the flow of liquids, mechanisms for stirring or mixing liquids, and heating or cooling units can be included.

The term "substantially" is used herein to modify a value, property, or degree and indicate a range that is within 70% of the absolute value, property, or degree. For example, an operation that occurs substantially entirely within a region can occur more than 70%, more than 75%, more than 80%, more than 85%, more than 90%, more than 95%, more than 96%, more than 97%, more than 98%, or more than 99% within the region. Similarly, two directions that are substantially identical can be more than 70%, more than 75%, more than 80%, more than 85%, more than 90%, more than 95%, more than 96%, more than 97%, more than 98%, or more than 99% identical.

The terms "about" and "approximately equal" are used herein to modify a numerical value and indicate a defined range around that value. If "X" is the value, "about X" or "approximately equal to X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

The terms "first" and "second" when used herein with reference to elements or properties are simply to more clearly distinguish the two elements or properties and unless stated otherwise are not intended to indicate order.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method for dispensing an analyte from a capillary electrophoresis tube, the method comprising:
    applying a voltage potential through a capillary electrophoresis tube, the capillary electrophoresis tube having a capillary outlet, and a capillary longitudinal axis proximate to the capillary outlet;
    impulsively pumping a sheath liquid through a microfluidic pump chamber having a internal region that is configured to be deformed by an impulsive pump element, wherein the capillary electrophoresis tube extends through the internal region of the microfluidic pump chamber, the microfluidic pump chamber being in fluidic connection with a microfluidic nozzle, the microfluidic nozzle having a nozzle outlet, a tapered internal region proximate to the nozzle outlet, and a nozzle longitudinal axis proximate to the nozzle outlet, wherein the capillary outlet of the capillary electrophoresis tube is located within the tapered internal region of the microfluidic nozzle;
    mixing a separated analyte with the sheath liquid, wherein the separated analyte exits the capillary electrophoresis tube through the capillary outlet, and the mixing of the separated analyte and the sheath liquid is substantially entirely within the tapered internal region of the microfluidic nozzle; and
    dispensing the mixture of the separated analyte and the sheath liquid through the nozzle outlet of the microfluidic nozzle.

2. The method of claim 1, wherein the capillary electrophoresis tube is at least partially filled with a separation buffer or a sieving matrix.

3. The method of claim 1 wherein the method further comprises:
    controlling the pressure of the sheath liquid in a sheath liquid reservoir, the sheath liquid reservoir in fluidic connection with the microfluidic pump chamber.

4. The method of claim 1 wherein the method further comprises:
    controlling the pressure of a capillary electrophoresis solution in a capillary electrophoresis solution reservoir, the capillary electrophoresis solution reservoir in fluidic connection with the capillary outlet.

5. The method of claim 1 wherein the method further comprises:
    flowing a capillary electrophoresis solution through the capillary electrophoresis tube and out of the capillary outlet, wherein the flowing is subsequent to applying the voltage potential.

6. The method of claim 1 wherein the capillary longitudinal axis of the capillary electrophoresis tube is parallel to the nozzle longitudinal axis of the microfluidic nozzle.

7. The method of claim 1 wherein the capillary longitudinal axis of the capillary electrophoresis tube extends through the nozzle outlet of the microfluidic nozzle.

8. The method of claim 1 wherein the capillary longitudinal axis of the capillary electrophoresis tube is coaxial with the nozzle longitudinal axis of the microfluidic nozzle.

9. The method of claim 1 wherein the dispensing of the mixture out of the nozzle creates one or more droplets.

10. The method of claim 1 wherein the dispensing of the mixture out of the nozzle creates a stream.

11. The method of claim 1 wherein the dispensing further comprises contacting the dispensed mixture with a surface.

12. The method of claim 11 wherein the surface comprises a hydrophobic material.

13. The method of claim 11 wherein the surface comprises a hydrophilic material.

14. The method of claim 11 wherein the surface is a blotting membrane.

15. The method of claim 11 further comprising:
    moving the surface relative to the microfluidic nozzle.

16. The method of claim 11 further comprising:
    moving the microfluidic nozzle relative to the surface.

17. The method of claim 1 wherein the capillary outlet terminates between about 5 µm and about 500 µm from the nozzle outlet.

18. The method of claim 1 wherein a diameter or a major axis of the nozzle outlet is between about 5 µm and about 200 µm.

19. The method of claim 1 wherein the impulsive pump element comprises a piezoelectric material or a thermoresistive material.

20. The method of claim 1 wherein the capillary longitudinal axis of the capillary electrophoresis tube is angled with respect to the nozzle longitudinal axis of the microfluidic nozzle.

* * * * *